UNITED STATES PATENT OFFICE.

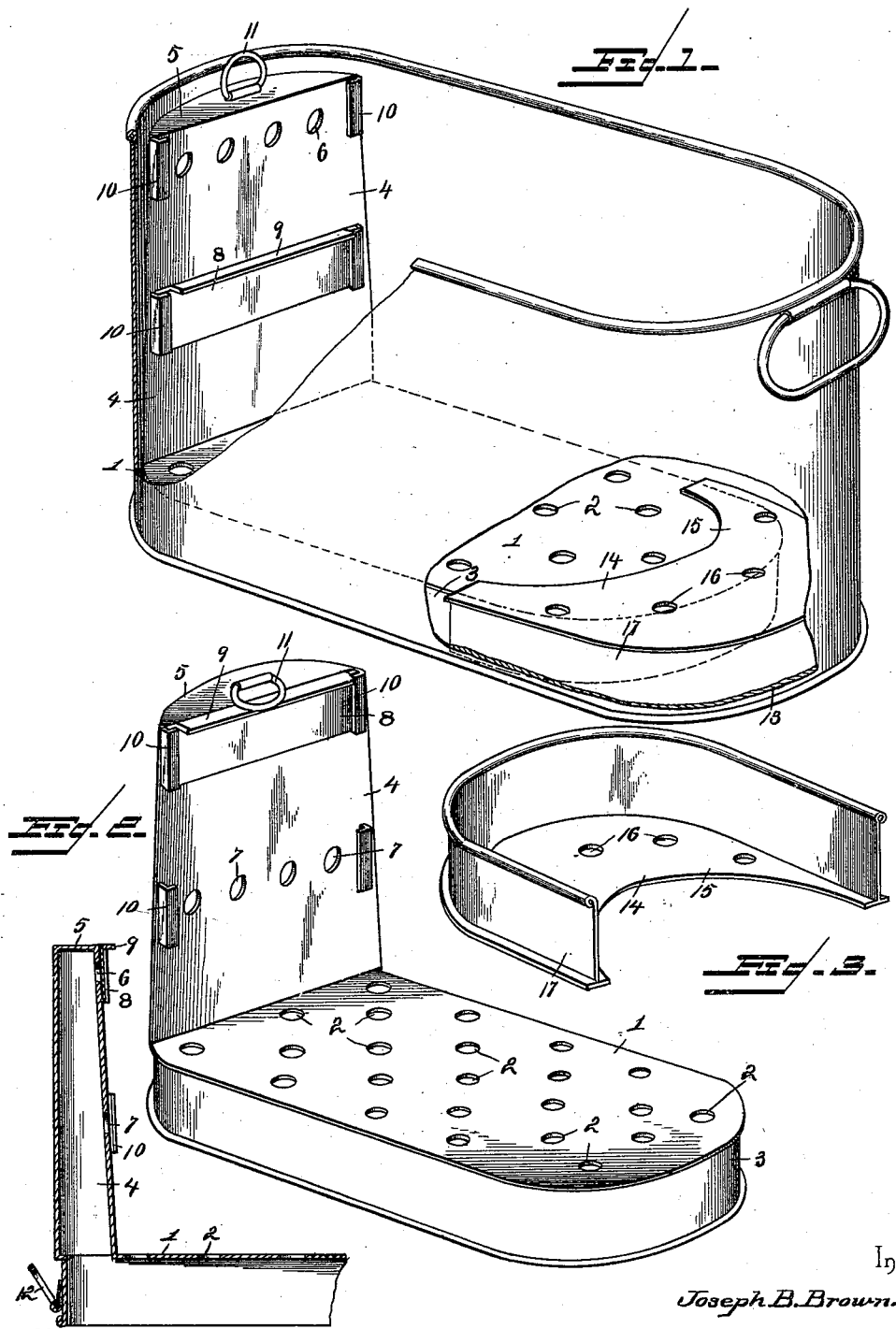

JOSEPH B. BROWN, OF SALEM, OREGON.

STEAM-COOKER.

SPECIFICATION forming part of Letters Patent No. 545,450, dated September 3, 1895.

Application filed June 20, 1895. Serial No. 553,442. (No model.)

*To all whom it may concern:*

Be it known that I, JOSEPH B. BROWN, a citizen of the United States, residing at Salem, in the county of Marion and State of Oregon, have invented a new and useful Steam-Cooker, of which the following is a specification.

This invention relates to an improved steam-cooker for preparing all kinds of food and edibles, and which can be used for canning fruits and for other purposes requiring the use of steam—such as cleansing fabrics, &c.—thereby providing a device which is capable of universal application for domestic purposes.

The invention aims to prevent the direct contact of the food or articles with the bottom of the utensil or vessel, thereby preventing burning, and at the same time providing a water-space at the bottom of the utensil for the free generation of steam, by means of which the cooking is effected.

The invention further aims to provide an attachment for use in connection with different-sized utensils or vessels, and which can be regulated to throw jets of steam and scalding water upon the food without disintegrating the latter, which would be the result if the said jets were thrown from a too great height. To attain these results the following means have been devised, and consist of an attachment comprising a false perforate bottom, an upright hollow extension or conducting-chamber at one end thereof, having several horizontal sets or series of perforations arranged at different elevations, a shiftable gate or cover, which may be utilized to cover one or the other of said sets or series of perforations, and an end extension for lengthening and shortening the bottom; also, in certain details of construction and arrangement of parts hereinafter described, and pointed out in the claims.

In the accompanying drawings, Figure 1 is a perspective view showing the invention applied, the shiftable gate covering the lower series of perforations, parts of the utensil being broken away. Fig. 2 is a perspective view of the attachment removed from the utensil and having the shiftable gate applied to the upper series of perforations. Fig. 3 is a perspective view of the end extension detached. Fig. 4 is a detail section of an end portion of the attachment.

Similar numerals of reference indicate corresponding parts in the several figures of the drawings.

Referring to the drawings, 1 indicates the base or a false bottom of the improved cooker attachment, made from a piece of sheet metal and provided with a number of perforations 2. The perforate plate 1 may be of any desired size or shape, preferably conforming to the interior configuration of the utensil or vessel 13, in connection with which the attachment is to be used, and is provided with a surrounding flange 3, whereby the perforate plate 1, when in position, is elevated slightly above the bottom of the said utensil. The false bottom is provided with an upright hollow extension 4, which is shown rounded on its outer face to conform to the interior shape of the utensil and is flat on its inner face. The hollow extension 4 is flattened and extends across the width of the utensil, and is closed at its upper end at 5, and communicates with the space beneath the perforate plate or bottom 1.

6 and 7 indicate two horizontal sets or series of perforations extending through the inner flat wall of the upright hollow extension 4 and communicating therewith, one of said sets or series of perforations being located and arranged near the top of the hollow extension, and the other set or series of perforations being arranged intermediate the upper series and the perforate false bottom 1.

8 indicates a shiftable gate or cover, preferably of sheet metal, which is adapted to be applied upon the inner face of the hollow extension 4 and outside thereof, as indicated in the drawings. The gate 8 is provided with a lifting-lip 9, and is adapted to slide at its side edges behind and to be engaged by suitable cleats or ways 10, attached in any suitable manner to the inner flat face of the hollow extension 4 on either side of each set or series of perforations. The gate or slide 8 is common to both sets of perforations and may be applied or shifted to one set or the other.

11 indicates a ring or loop attached to the upper end of the hollow extension 4, by means of which the attachment may be lifted out of the utensil 13, and 12 indicates a similar ring or loop, by means of which the attachment may be suspended upon a nail or hook when not in use.

In operation the attachment hereinabove described is placed within a utensil or vessel 13 of ordinary construction and sufficient water is introduced therein to cover the perforated false bottom. The food to be cooked or the clothing to be cleansed is placed upon the false bottom, and if the quantity is small the gate 8 is placed in front of the upper set or series of perforations 6, while if the quantity is large the gate is placed in front of the lower set or series of perforations 7 in the hollow extension 4. When the water boils, jets of steam and scalding water pass through the perforations 6 or 7, as the case may be, and are discharged upon the food or articles in the utensil or vessel, thereby attaining the desired result in a thorough and rapid manner, the circulation being upward through the conducting-chamber 4, thence over and downward through the food or articles and through the false bottom to be again heated and used over. By means of the shiftable gate or slide 8 the attachment described may be quickly and easily changed and regulated to accommodate either a large or a small quantity or bulk of food or articles to be treated.

For all practical purposes, cooking utensils, as usually constructed for domestic use, are of a given width, but vary appreciably in length, and in order that the attachment may be adapted for different-sized utensils or vessels, so as to obviate the providing of a space between the end of the utensils and the opposing end of the attachment, the latter is supplied with an extensible end section 14, which is preferably formed of sheet metal, and is crescent-shaped to conform to the space provided between the end of the attachment and the opposing end of the utensil. The extensible end section comprises a crescent-shaped top 15, having a series of openings 16 and a depending-flange 17, which corresponds in height to the depth of the flange 3, so that the top 15 will rest snugly upon the false bottom 1 and obtain a close joint therewith. This end section 14 is adapted to be moved in or out, so as to vary the length of the attachment, and is designed to support the food or articles above and out of contact with the bottom of the utensil or vessel in the event of the false bottom 1 not reaching to the end of the said utensil.

By having the hollow extension 4 flattened and extending the full width of the perforated false bottom 1, a circulation of the steam and the scalding water is had at every point of the space comprised between the side flanges of the attachment, and this would not be the case if the said extension 4 only occupied a position intermediate of the sides of the attachment. By having the hollow extension 4 located at one end of the attachment, a strong circulation is attained, as there are no counter currents to interfere and detract from the force of the circulation, which would result by providing two or more extensions or by locating the one at a point between the ends of the attachment.

Changes in the form, proportion, and the minor details of construction may be resorted to without departing from the principle or sacrificing any of the advantages of this invention.

Having thus described the invention, what is claimed as new is—

1. An attachment for steaming and cooking comprising a perforate false bottom having an upright hollow extension provided with a series of horizontally-disposed openings arranged at different levels, and a gate common to the series of openings and adapted to be shifted from one set of openings to the other, whereby the attachment can be used in connection with a large or small quantity of food or articles, substantially as set forth.

2. An attachment for steaming and cooking comprising a perforate false bottom having an upright hollow extension provided with a series of horizontally-disposed openings arranged at different levels, and having vertical ways at the ends of each set of openings, and a gate adapted to be applied to the exterior of the hollow extension and to be shifted from one set of openings to the other, whereby the attachment is adapted for a large or small quantity of food or articles, substantially as specified.

3. The combination with an attachment for steaming and cooking comprising a perforate false bottom having an upright hollow extension formed with escape openings, of an extensible end section comprising a crescent-shaped top having openings formed therein and a depending flange at the outer edge of the said top, substantially as described for the purpose set forth.

4. As an improved article of manufacture, an attachment for steaming and cooking comprising a perforate false bottom having a depending flange and provided at one end with an upright hollow extension which is curved on its outer side and flattened on its inner side, and which extends approximately the full width of the bottom, said extension being closed at its upper end, and having at different levels in its inner flattened side a series of horizontally-disposed openings, a shiftable gate common to each set of openings and adapted to close one or the other thereof, and an extensible end section, substantially as described for the purpose set forth.

In testimony that I claim the foregoing as my own I have hereto affixed my signature in the presence of two witnesses.

J. B. BROWN.

Witnesses:
 O. BOWEN,
 E. S. PLATTS,